US009372524B2

(12) United States Patent
Sistla et al.

(10) Patent No.: US 9,372,524 B2
(45) Date of Patent: Jun. 21, 2016

(54) DYNAMICALLY MODIFYING A POWER/PERFORMANCE TRADEOFF BASED ON PROCESSOR UTILIZATION

(75) Inventors: Krishnakanth V. Sistla, Beaverton, OR (US); Mark Rowland, Beaverton, OR (US); Ankush Varma, Hillsboro, OR (US); Ian M. Steiner, Hillsboro, OR (US); Matthew Bace, North Andover, MA (US); Daniel Borkowski, Lunenburg, MA (US); Vivek Garg, Folsom, CA (US); Cagdas Akturan, Hillsboro, OR (US); Avinash N. Ananthakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1093 days.

(21) Appl. No.: 13/326,605

(22) Filed: Dec. 15, 2011

(65) Prior Publication Data
US 2012/0144217 A1 Jun. 7, 2012

(51) Int. Cl.
*G06F 1/00* (2006.01)
*G06F 1/32* (2006.01)

(52) U.S. Cl.
CPC .............. *G06F 1/3228* (2013.01); *G06F 1/324* (2013.01); *G06F 1/3287* (2013.01); *Y02B 60/1217* (2013.01); *Y02B 60/1282* (2013.01)

(58) Field of Classification Search
CPC ..... G06F 1/3228; G06F 1/324; G06F 1/3287; Y02B 60/1217; Y02B 60/1282
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,572,438 | A | 11/1996 | Ehlers et al. |
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |

(Continued)

FOREIGN PATENT DOCUMENTS

| CN | 1183860 | 6/1998 |
| CN | 101794167 | 8/2010 |

(Continued)

OTHER PUBLICATIONS

International Searching Authority, "Notification of Transmittal of the International Search Report and the Written Opinion of the International Searching Authority," mailed Apr. 30, 2013, in International application No. PCT/US2012/069592.

(Continued)

*Primary Examiner* — M Elamin
(74) *Attorney, Agent, or Firm* — Trop, Pruner & Hu, P.C.

(57) ABSTRACT

In one embodiment, the present invention includes a multi-core processor having a power controller with logic to dynamically switch a power management policy from a power biased policy to a performance biased policy when a utilization of the processor exceeds a threshold level. Thus at low utilizations, reduced power consumption can be realized, while at higher utilizations, greater performance can be realized. Other embodiments are described and claimed.

18 Claims, 9 Drawing Sheets

(56) References Cited

U.S. PATENT DOCUMENTS

| | | | |
|---|---|---|---|
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,346,787 B2 | 3/2008 | Vaidya et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,647,513 B2 | 1/2010 | Tobias et al. | |
| 7,689,847 B2* | 3/2010 | Chang et al. | 713/322 |
| 7,702,937 B2 | 4/2010 | Oh et al. | |
| 7,702,938 B2* | 4/2010 | Ha | 713/323 |
| 7,730,340 B2 | 6/2010 | Hu et al. | |
| 8,010,822 B2* | 8/2011 | Marshall et al. | 713/324 |
| 8,112,647 B2* | 2/2012 | Branover et al. | 713/320 |
| 8,689,028 B2* | 4/2014 | Diefenbaugh et al. | 713/320 |
| 2001/0044909 A1 | 11/2001 | Oh et al. | |
| 2002/0194509 A1 | 12/2002 | Plante et al. | |
| 2003/0009701 A1 | 1/2003 | Kurosawa | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0283624 A1* | 12/2005 | Kumar et al. | 713/300 |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2007/0283176 A1 | 12/2007 | Tobias et al. | |
| 2007/0288769 A1* | 12/2007 | Chang et al. | 713/300 |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0249094 A1* | 10/2009 | Marshall et al. | 713/320 |
| 2010/0058078 A1* | 3/2010 | Branover et al. | 713/300 |
| 2010/0077243 A1* | 3/2010 | Wang et al. | 713/323 |
| 2010/0115309 A1 | 5/2010 | Carvalho et al. | |
| 2010/0146513 A1 | 6/2010 | Song | |
| 2010/0162023 A1* | 6/2010 | Rotem | G06F 1/3203 713/340 |
| 2010/0169692 A1 | 7/2010 | Burton | |
| 2010/0191997 A1 | 7/2010 | Dodeja et al. | |
| 2010/0192149 A1* | 7/2010 | Lathrop et al. | 718/1 |
| 2011/0154090 A1 | 6/2011 | Dixon et al. | |
| 2011/0307730 A1* | 12/2011 | Marshall et al. | 713/324 |

FOREIGN PATENT DOCUMENTS

| | | |
|---|---|---|
| EP | 1 282 030 A1 | 5/2003 |
| TW | 200416616 A | 9/2004 |
| TW | 201030506 A | 8/2010 |

OTHER PUBLICATIONS

Tochinori Sato, et al., "Dependability, Power, and Performance Trade-Off on a Multicore Processor," Mar. 2008, pp. 714-719.

Luca Benini, et al., "Policy Optimization for Dynamic Power Management," Jun. 1999, pp. 814-815.

Taiwan Patent Office, Office Action Mailed Jul. 30, 2014, in Taiwan Application No. 101147478.

State Intellectual Property Office of the People's Republic of China, Office Action mailed Dec. 12, 2015 in Chinese Patent Application No. 2012800617706.6.

U.S. Appl. No. 12/889,121, "Providing Per Core Voltage and Frequency Control," filed Sep. 23, 2010, by Pakaj Kumar.

SPEC-Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

Intel Developer Forum, IDF2010, Opher Kahn, et al., "Intel Next Generation Microarchitecture Codename Sandy Bridge: New Processor Innovations," Sep. 13, 2010, 58 pages.

* cited by examiner

DYNAMICALLY MODIFYING A POWER/PERFORMANCE TRADEOFF BASED ON PROCESSOR UTILIZATION

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

In many computing environments, it is an established fact that for most times systems such as servers are operating well below their peak performance. During these periods of low utilization the focus is on saving as much power as possible in order to reduce energy costs. Power management technologies can deliver significant power savings during periods of low utilization. However every power management technology involves a power/performance tradeoff, especially during periods of high activity. A user would ideally like to save as much power as possible at low utilization while realizing maximum performance at times of high utilization.

Users who cannot tolerate performance loss at high utilizations typically tune power management features for a performance policy. This implies that when the server is underutilized, it will consume more power than optimal. Users who like to save power at low utilizations typically tune power management features for a power saver policy. This implies that when the server is highly utilized, the highest performance of the server may not be realized. However, at low server utilizations where the end user can typically tolerate higher performance loss, available power savings are not realized.

DETAILED DESCRIPTION

Embodiments provide a mechanism for detecting periods of low/medium utilization of a processor such as a multicore processor and responsive to this detection, tuning power management features to save as much power as possible. At the same, the mechanism can detect periods of high utilization of the processor and tune power management features to minimize performance loss. More specifically, a dynamic loadline tuning architecture is provided to enable this mechanism.

Figure 1:
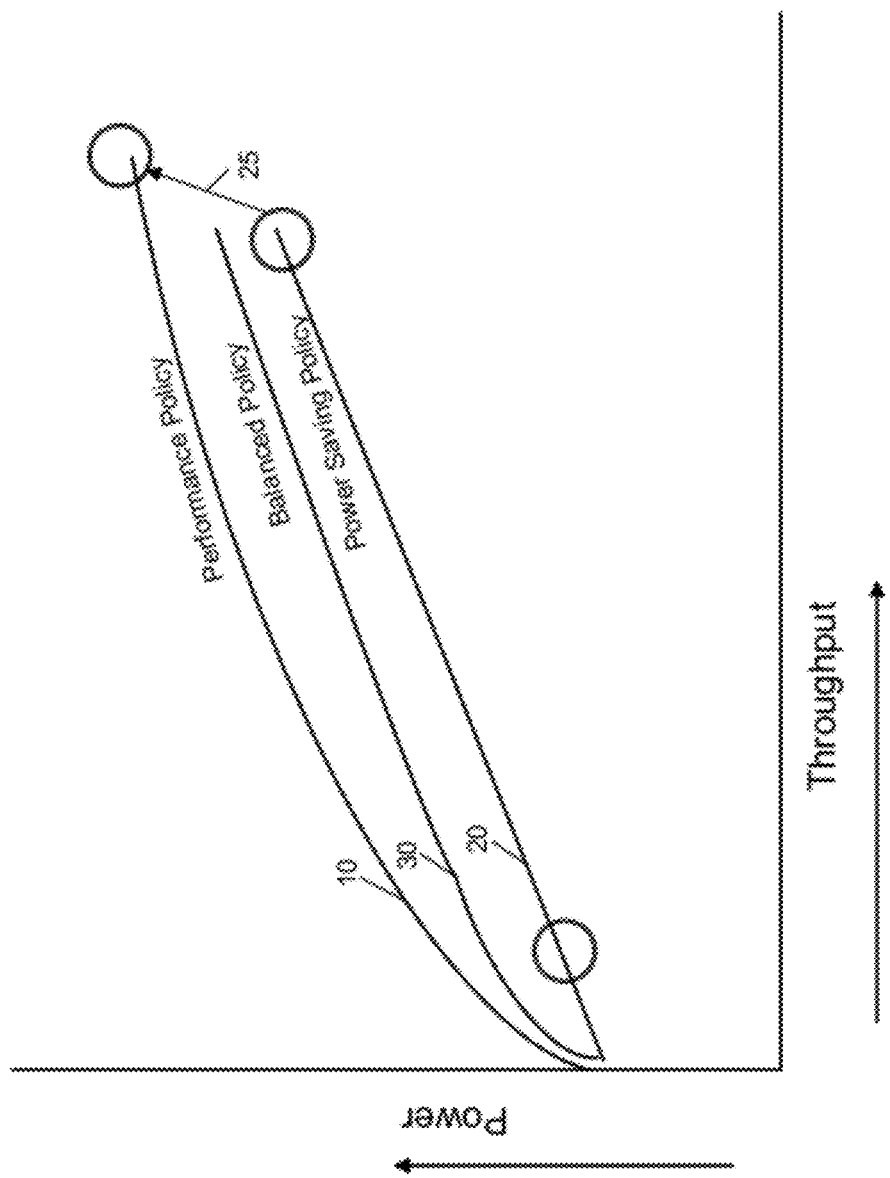
FIG. 1 is a graphical illustration of an example power performance loadline for different power/performance profiles with dynamic loadline tuning in accordance with an embodiment of the present invention.

A power performance loadline is a representation of power consumption of a computer system such as a server at different utilizations. This loadline thus represents the power consumed at each delivered performance level and takes into account the performance impact of a power management feature. FIG. 1 is a graphical illustration of an example power performance loadline of a server for different settings of power/performance tuning. When power/performance settings are biased towards performance via a performance policy 10, the server achieves the highest performance possible; however power consumption at low to medium utilization is higher. When power/performance settings are biased towards power via a power saving policy 20, the power consumption at low to medium utilization is reduced; however peak performance is also reduced. In turn, a balanced policy 30 in power/performance settings provides a middle ground between power and performance settings. As used herein, the concept of power/performance tuning is in a generic manner. In very general terms this represents a set of tunings for multiple power management features. The term "performance policy" represents a set of tunings that are performance oriented. Similarly, the term "power saver policy" is used to represent power oriented tunings, and the term "balanced policy" is used to represent tunings between the power saver policy and the performance policy. Generally, a power saver policy and a balanced policy can be considered non-performance policies.

In a conventional system, these different loadlines are statically realized by a static configuration of the system. As an example, an operating system (OS) can provide a static selection of one of these three policies, which can be configured by an end user. Instead, embodiments provide a technique to dynamically and automatically switch between power biased settings and performance biased settings. In this way power can be saved at low utilizations while preserving performance at high utilizations. More specifically, embodiments provide a power performance loadline that follows power saving policy 20 at low utilization and instead dynamically moves to performance policy 10 at high utilization via a dynamic loadline switch 25.

In various embodiments, a dynamic loadline tuning algorithm can be used to detect a utilization point at which the maximum performance level achievable for the current power/performance tuning is reached and switch the policy towards a performance biased tuning. This maximum performance level can be configurable in various embodiments. As an example based on utilization, dynamic loadline tuning can save anywhere between approximately 8 watts (W) to 30 W and between 40% and 70% utilization. It can also be seen that at utilization nearing 100%, the performance level matches a performance policy. Embodiments thus maximize power savings at low utilization while maximizing performance at high utilization.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Figure 2:
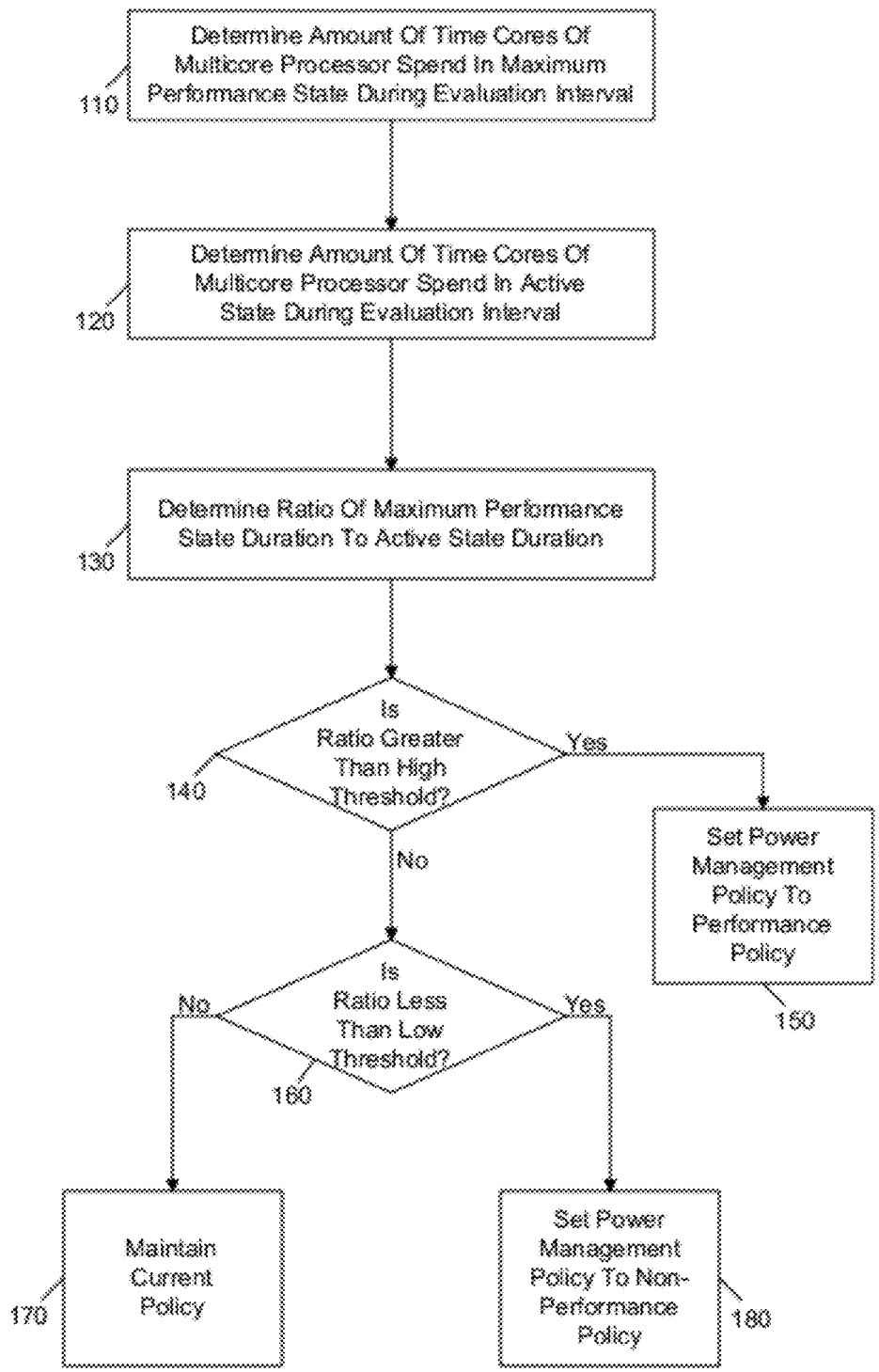
FIG. 2 is a flow diagram of a method in accordance with an embodiment of the present invention.

Referring now to FIG. 2, shown is a flow diagram of a method in accordance with an embodiment of the present invention. As shown in FIG. 2, method 100 can be performed in a power controller such as a power control unit (PCU) of a processor. More specifically, the PCU can include a dynamic loadline tuning logic in accordance with an embodiment of the present invention. As seen, method 100 can begin by determining an amount of time that cores of a multicore processor spend in a maximum performance state during an evaluation interval (block 110). As will be discussed further below, different manners of determining this time duration can be performed. Note that while the method of FIG. 2 is with regard to a multicore processor, understand the scope of the present invention is not limited in this aspect and other embodiments apply equally to single core processors.

As further seen method 100 continues by determining an amount of time that the cores of the processor spend in an active state during the evaluation interval (block 120). It is likely that the amount of time spent in an active state is greater than the amount of time spent in a maximum performance state, since it is likely that at least one of the cores for at least some amount of the time of the evaluation interval is in an active state, but not a maximum performance state.

Still referring to FIG. 2, at block 130 a ratio can be determined. More specifically this ratio may correspond to comparison of the duration in the maximum performance state to the duration in the active state. In this way, if the two durations are the same, the ratio is 1. If the time spent in an active state is much greater than the time spent in the maximum performance state, the ratio will be closer to 0.

Embodiments may leverage this ratio information to determine whether to dynamically switch between power management policies. Specifically as seen in FIG. 2 at diamond 140 it can be determined whether this ratio is greater than a first threshold, namely a high threshold. Although the scope of the present invention is not limited in this regard in some embodiments this high threshold can be between approximately 70% and 90%. Note that this high threshold can be dynamically configurable by a user, e.g., based on a characterization of the typical workload for the system. If the ratio is above this high threshold, control passes to block 150 where the power management policy can be set to a performance policy. This is so, as at this high ratio cores are in a maximum performance state for the majority of the time that the cores are active, and thus the system would likely benefit from a higher performance policy which although may reduce the power savings, can increase throughput and thus potentially reduce total consumed power.

Still referring to FIG. 2, if instead the ratio is less than this high threshold, control passes to diamond 160 where it can be determined whether the ratio is lower than a low threshold. Although the scope of the present invention is not limited in this regard in some embodiments this low threshold can be between approximately 10% and 30%. If the ratio is less than this low threshold, control passes to block 180, where the power management policy can be set to a non-performance policy. Otherwise if the ratio is between the thresholds, control passes to block 170 where the current policy can be maintained. Note that the updating of the policy can be implemented by updating a value of a configuration register, e.g., in the PCU. Although shown with this particular implementation in the embodiment of FIG. 2, understand the scope of the present invention is not limited in this regard.

As demanded performance of a system increases, the operating system requests higher performance states (known as P-states). At a given performance state, if cores become idle, they enter into idle states (known as C-states). These states can be in accordance with an OS-based mechanism, namely the Advanced Configuration and Platform Interface (ACPI) standard (e.g., Rev. 3.0b, published Oct. 10, 2006). According to ACPI, a processor can operate at various power and performance states. With regard to power states, ACPI specifies different power consumption states, generally referred to as so-called C1 to Cn states. When a core is active, it runs at a C0 state, and when the core is idle it may be placed in a core low power state, a so-called core non-zero C-state (e.g., C1-C6 states). In addition to these power states, a processor can further be configured to operate at one of multiple performance states, namely from P0 to PN. In general, the P1 performance state may correspond to the highest guaranteed performance state that can be requested by an OS. In addition to this P1 state, the OS can further request a higher performance state, namely a P0 state, which corresponds to a maximum performance state. This P0 state may thus be an opportunistic state in which, when power and/or thermal budget is available, processor hardware can configure the processor or at least portions thereof to operate at a higher than guaranteed frequency.

As the system utilization moves from medium to high levels, the average P-state increases and eventually reaches the maximum turbo state. At the same time the available idle periods reduce and the cores stay active for most of the time. In one embodiment, by detecting the point at which all cores are at the highest P-state for an entire evaluation interval, it can be concluded that the highest performance point for the current power/performance settings is reached.

For a given evaluation period T(Eval), the time spent by the $i^{th}$ core when it is in an active state (e.g., C0) at the highest P-state (Pmax) is represented as T(i,C0,Pmax), and can be referred to as a maximum active time.

The sum of this time across all cores (e.g., M cores) thus equals:

$$T(C0,Pmax)=\Sigma T(i,C0,Pmax).$$

The highest value of T(C0,Pmax) is equal to M*T(Eval). When T(C0,Pmax) reaches its highest value then the highest performance point for the current power/performance settings is reached. This is the principle used for a dynamic switching detector in accordance with an embodiment of the present invention.

Two additional considerations may be accounted for with regard to the detector. First, the detector can be made immune to instantaneous changes in performance. To this end, an exponential moving average of the total maximum active time metric can be calculated. The average computed for the $N^{th}$ period is given below, where α represents an averaging constant.

$$\text{Average } T(C0,Pmax,N)=\alpha*\text{Average } T(C0,Pmax, N-1)+(1-\alpha)*T(C0,Pmax).$$

A second consideration is the fact the number of active cores changes from one workload to another and from one period to another. In order to ensure that the detector can accommodate such varying workloads, the following can be performed. In each period T(Eval), T(C0,i) represents the active time for the $i^{th}$ core. When summed across M cores this yields T(C0), and can be referred to as an active time. Now the average of T(C0) for the $N^{th}$ period can be computed using the same method as the average for T(C0,Pmax):

$$\text{Average } T(C0,N)=\alpha*\text{Average } T(C0,N-1)+(1-\alpha)*T(C0).$$

Average T (C0, N) thus represents the average active time of all cores, and Average T (C0,Pmax,N) represents the average time for all cores when they are active and are the highest P-state.

At the highest performance point, both averages will become very close to each other. Thus the detector may determine an optimal switch point between performance and non-performance policies in part in accordance with the following:

$$\text{Detector Ratio}=\text{Average } T(C0,Pmax,N)/\text{Average } T(C0,N)$$

If the detector ratio is very close to 1 (e.g., between approximately 80% and 100%), then a switch to a performance policy can be performed. If instead the detector ratio is well below 1, then a switch to a non-performance policy can be made (either to a power saver or balanced policy, based on user configuration).

To ensure that the algorithm is stable, high and low thresholds, Threshold_High and Threshold_Low, can be defined. The detector thus determines the operating point, which can be used to dynamically set the appropriate policy. If the detector ratio is greater than Threshold_High, the policy is set to a performance policy. If the detector ratio is less than the Threshold_Low, the Policy is set to a non-performance policy, e.g., one of a power saver or balanced policy. Alternately, an OS or other software can also be given the flexibility of choosing Threshold_High and Threshold_Low values.

Figure 3:
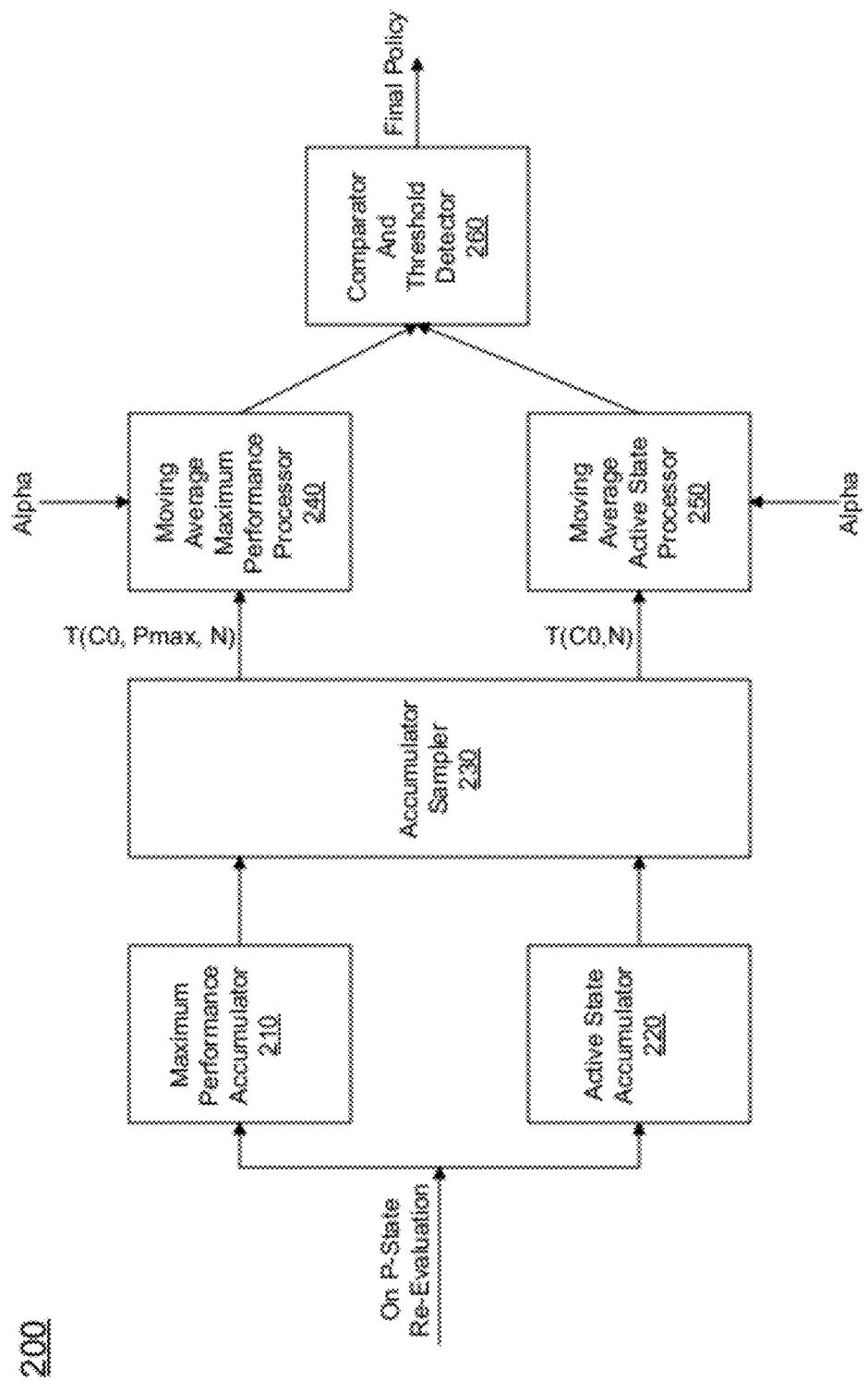
FIG. 3 is a block diagram of a dynamic switching architecture in accordance with one embodiment of the present invention.

FIG. 3 is a block diagram of a dynamic switching architecture in accordance with one embodiment of the present invention. As seen in FIG. 3, a dynamic policy switcher 200, which can be implemented within circuitry of a PCU, in one embodiment, can be used to determine an amount of time during an evaluation interval that a processor is in various states, compare the durations in a given manner, and based at least in part on the comparison and optionally a threshold determine a power management policy to be applied during a next operation interval, which in some embodiments can correspond to a next evaluation interval. As seen, switcher 200 receives information regarding state changes to one or more cores of the processor. Upon any such state change, values of a maximum performance accumulator 210 and an active state accumulator 220 can be updated to maintain a sum of the total duration of an evaluation interval in which the processor cores are in the given state. As seen, this information can be provided to an accumulator sampler 230, which may sample the values from the accumulators according to a predetermined interval, e.g., every millisecond. At the same time, the sampler can cause the accumulator values to be reset in order to begin accumulating for a next evaluation interval.

Sampler 230 provides a time duration in which the processor was in a maximum performance state during the evaluation interval to a moving average maximum performance processor 240. In addition, sampler 230 provides an active state value corresponding to a duration of time during the evaluation interval that the cores of the processor were in an active state to a moving average active state processor 250. As seen, these processors may further receive an alpha value, details of which will be discussed further below.

Based on this information, these processors can generate moving averages, which can be an average of the sampler outputs over a number of evaluation intervals. For example, although the scope of the present invention is not limited in this regard in some embodiments the moving average can be formed of evaluation intervals between approximately 5 milliseconds and 100 milliseconds. Thus these average duration values can be provided to a comparator and threshold detector 260. First, a ratio can be determined that corresponds the amount of time in a maximum performance state to the total time in an active state. This ratio can then be compared to one or more thresholds. Based on this comparison, a power management policy can be selected that can be the same as for the previous evaluation interval, or can be a dynamic switch, e.g., from a non-performance policy to a performance policy or vice-versa. Further details of the actual calculations performed will be described further below.

In various embodiments, maximum active state accumulator 210 generates the sum of total time spent in (C0, Pmax) state across all cores. This accumulator can be implemented in an event handler that is triggered every time there is a change in C-state and/or P-state of any core. The event handler maintains two variables, an entry time stamp per core for the (C0, Pmax) state and a state mask that represents whether a particular core was in the (C0, Pmax) state the last time the event handler was called. When the event handler is called, it loops across all cores and computes a current state mask. It compares the current state mask with the last state mask and detects whether a particular core exited (C0, Pmax) state or entered (C0, Pmax) state or remained in the same state as before. When an exit is detected from (C0, Pmax) state, the entry time stamp is subtracted from the current time stamp and the resulting value is added into the T (C0, Pmax) accumulator. If an entry into (C0, Pmax) is detected, then the current time stamp is stored in the last time stamp for that core. When these actions are completed across all cores, the accumulator contains the latest value of T (C0, Pmax).

In various embodiments, active state accumulator 220 generates the sum of total time spent in (C0) state across all cores. This accumulator can similarly be implemented in an event handler that is triggered every time there is a change in C-state and/or P-state of a core. The event handler maintains two variables, an entry time stamp per core for the (C0) state and a state mask that represents whether a particular core was in the (C0) state the last time event handler was called. When the event handler is called, it loops across all cores and computes a current state mask. It compares the current state mask with the last state mask and detects whether a particular core exited (C0) state or entered (C0) state or remained in the same state as before. When an exit is detected from the (C0) state, the entry time stamp is subtracted from the current time stamp and the resulting value is added into the T(C0) accumulator. If an entry into (C0) is detected, then the current time stamp is stored in the last time stamp for the core. When these actions are completed across all cores, the accumulator contains the latest value of T(C0).

In one embodiment, accumulator sampler 230 can sample the accumulators once every 1 ms. This sampling rate may be adjusted based on a desired response time. Once the accumulators are sampled, they can be reset to zero to allow accumulation for the next evaluation period. The sampled values can be stored into a given storage area such as a pair of registers to store T (C0, Pmax, N) and T (C0, N) respectively.

In turn, processors 240 and 250 perform an exponential moving average calculation by updating the average values using the latest sampled inputs of T(C0, Pmax, N) and T(C0, N). Processors 240 and 250 can generate the average immediately after the accumulator sampler generates the sampled values at the same rate (e.g., once every 1 ms), and thus can generate average T (C0, Pmax) and average T (C0).

In turn, a comparator 260 can be executed responsive to receipt of the average values. In comparator 260 a ratio of average T(C0, Pmax) and Average T(C0) can be computed. This ratio can then be compared to high and low thresholds. From this comparison, as described above a final determination of the operative policy can be generated.

Figure 4:
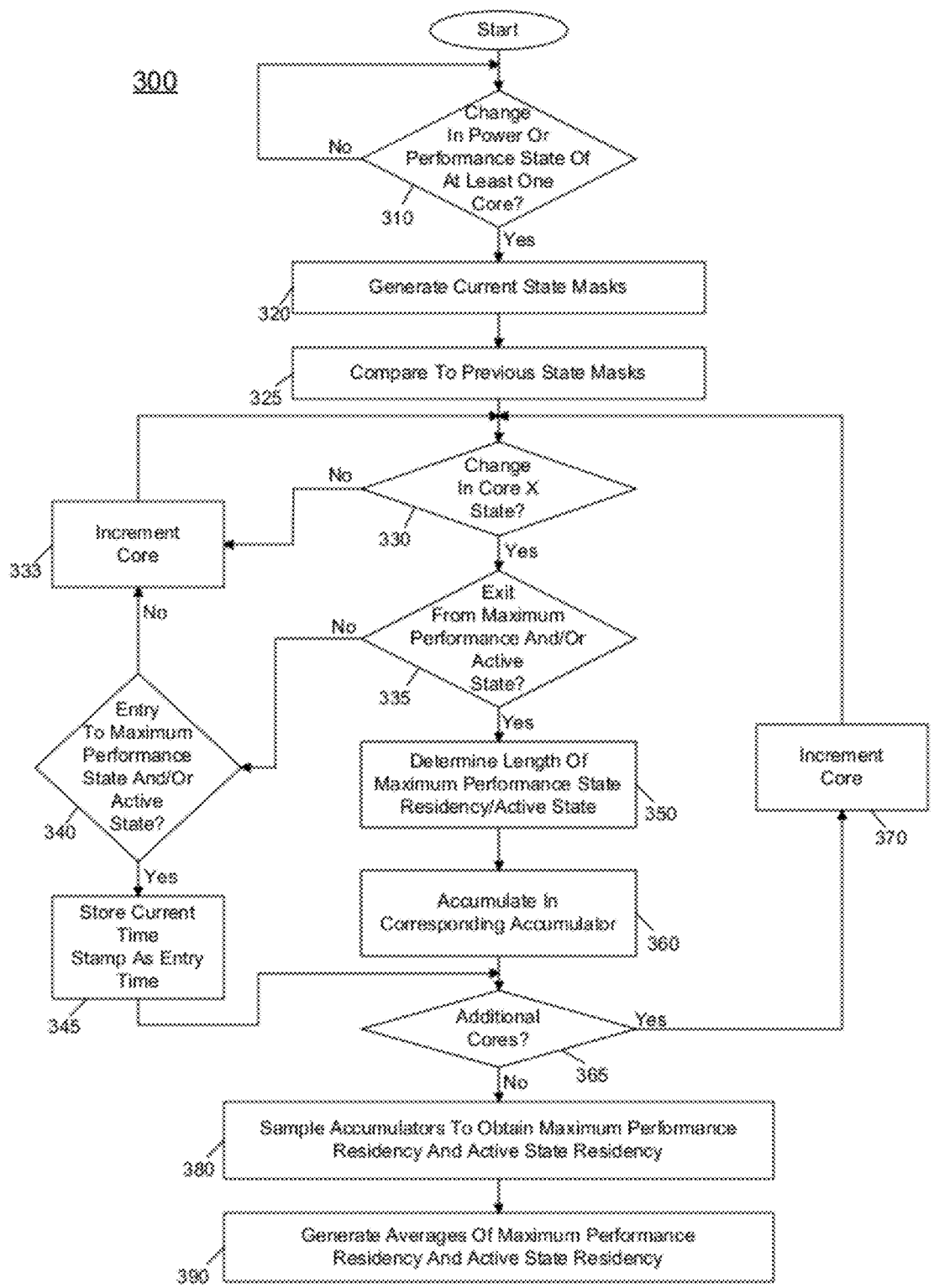
FIG. 4 is a flow diagram of a method of determining time in maximum performance and active states in accordance with an embodiment of the present invention.

Although the analysis with regard to determining durations in maximum performance and active states are described with reference to the circuit of FIG. 3 and the following discussion of the flowchart of FIG. 4, understand that determinations with regard to these durations can be made in other manners in different embodiments. Referring now to FIG. 4, shown is a flow diagram of a method of determining time in maximum performance and active states in accordance with an embodiment of the present invention. Method 300 can be implemented in circuit 200 of FIG. 3 in some embodiments. As seen, the method begins by determining whether a change in a power or performance state of at least one core has occurred (diamond 310). This can be determined by receiving a request for such a state change in a PCU or other power controller. From this information with regard to the updated states of the different processors, current state masks can be generated (block 320). Note that there can be multiple state masks, namely one with regard to maximum performance state and one with regard to active state. These masks can be compared to previous state masks at block 325. In this way it can be determined whether a given core's state has changed since the last execution of method 300. Accordingly, for each core of a multicore processor a loop beginning at diamond 330 can be performed.

At diamond 330 it can be determined whether a change in a given core's state has occurred. If so control passes to diamond 335 where it can be determined whether this state change is an exit from the maximum performance and/or active states. If so, control passes to block 350 where the length of the core's residency in the maximum performance state and/or the active state can be determined. As will be discussed further, this determination can be based on time stamp information in some embodiments. This determined value then may be accumulated in the corresponding accumulator at block 360. Control then passes to diamond 365 where it can be determined whether additional cores are to be analyzed. If so, control passes to block 370 where the core number can be incremented and control passes back to diamond 330 discussed above. Note further that if no change in a given core state is determined at diamond 330, the same incrementing of cores can be done at block 333 with control passing also to diamond 330.

Still referring to FIG. 4 otherwise if no exit for the core is determined, control passes to diamond 340 where it can be determined whether an entry to a maximum performance and/or active state has occurred. If so, control passes to block 345 where a current time stamp can be recorded for the corresponding core to indicate this entry time. Control passes to diamond 365 as above.

Once the state of all of the cores has been determined and the various values updated accordingly, control passes to block 380 where the accumulators can be sampled to obtain the maximum performance residency value and the active state residency value. Control then passes to block 390 where from these values averages, e.g., moving averages, of the maximum performance residency and the active state residency can be generated. In one embodiment, these values can then be used to determine a ratio between them, and from which a given power management policy selection can be made. Although shown with this specific implementation in the embodiment of FIG. 4, understand the scope of the present invention is not limited in this regard.

Referring now to Table 1 shown is an accumulator algorithm pseudocode in accordance with one embodiment of the present invention.

TABLE 1

Bit Vector Last_C0_Mask[Num_Cores];
Bit Vector Last_C0Pmax_Mask[Num_Cores];
Bit Vector Current_C0_Mask[Num_Cores];
Bit Vector Current_C0Pmax_Mask[Num_Cores];
Array Last_C0_Time_Stamp[Num_Cores];
Array Last_C0Pmax_Time_Stamp[Num_Cores];
T_C0Pmax_Accumulator;
T_C0_Accumulator;
Current_Time_Stamp;
On (P-State or C-State change):
//Sample current time stamp
Current_Time_Stamp = Read_TSC( )
//Capture current state masks
For (i=1; i<=Num_Cores; i++) {
If( current_state = C0), Current_C0_Mask[i] = 1
If ( current_state = C0 and P-state =Pmax),
Current_C0Pmax_Mask[i]=1}
//Compare with previous state, update C0,Pmax accumulator
For(i=0; i<= Num_Cores;i++) {
If( Current_C0Pmax_Mask[i] = 1 and Last_C0Pmax_Mask[i] =0)
//Entry into C0Pmax
{
Last_C0Pmax_Time_Stamp[i] = Current_Time_Stamp}
Else if( Current_C0Pmax_Mask[i] =0 and Last_C0Pmax_Mask[i] =1)
// Exit from C0Pmax
{
T_C0Pmax_Accumulator += Current_Time_Stamp − Last_C0Pmax_Time_Stamp[i]}
Else if( Current_C0Pmax_Mask[i]=1 and Last_C0Pmax_Mask[i]=1)
//Continuing in C0Pmax
{
T_C0Pmax_Accumulator += Current_Time_Stamp− Last_C0Pmax_Time_Stamp[i]
Last_C0Pmax_Time_Stamp[i] = Current_Time_Stamp}
}

TABLE 1-continued

```
//Compare with previous state, update C0 accumulator
For(i=0; i<= Num_Cores;i++) {
If( Current_C0_Mask[i] = 1 and Last_C0_Mask[i] =0)
//Entry into C0
{
Last_C0_Time_Stamp[i] = Current_Time_Stamp}
Else if( Current_C0_Mask[i] =0 and Last_C0_Mask[i] =1)
// Exit from C0
{
T_C0_Accumulator += Current_Time_Stamp -
Last_C0_Time_Stamp[i]}
Else if( Current_C0_Mask[i]=1 and Last_C0_Mask[i]=1)
//Continuing in C0
{
T_C0_Accumulator+=Current_Time_Stamp-Last_C0_Time_Stamp[i]
Last_C0_Time_Stamp[i] = Current_Time_Stamp}
}
```

In one embodiment, the dynamic loadline tuning algorithm has three tunable parameters. Alpha, threshold high and threshold low. In some embodiments, these values can be tuned in a system with real workloads, which can run at different utilizations based on these values to ensure that switching happens at maximum performance.

Using embodiments of the present invention, an end user can realize reduced power consumption at low utilizations and more specifically, the end user can choose a preferred tuning policy at low/medium utilization, namely a tuning that maximizes the power savings for a target utilization. At high utilization, the processor can dynamically and automatically switch to a performance policy, thus preventing any performance loss. Accordingly, the processor can dynamically detect utilization and switch a power/performance policy dynamically based on utilization.

In this way, a user who previously used a performance policy can realize power savings for a typical usage (e.g., low/medium utilization) by choosing a power saver or balanced mode without being concerned about losing peak performance.

Figure 5:
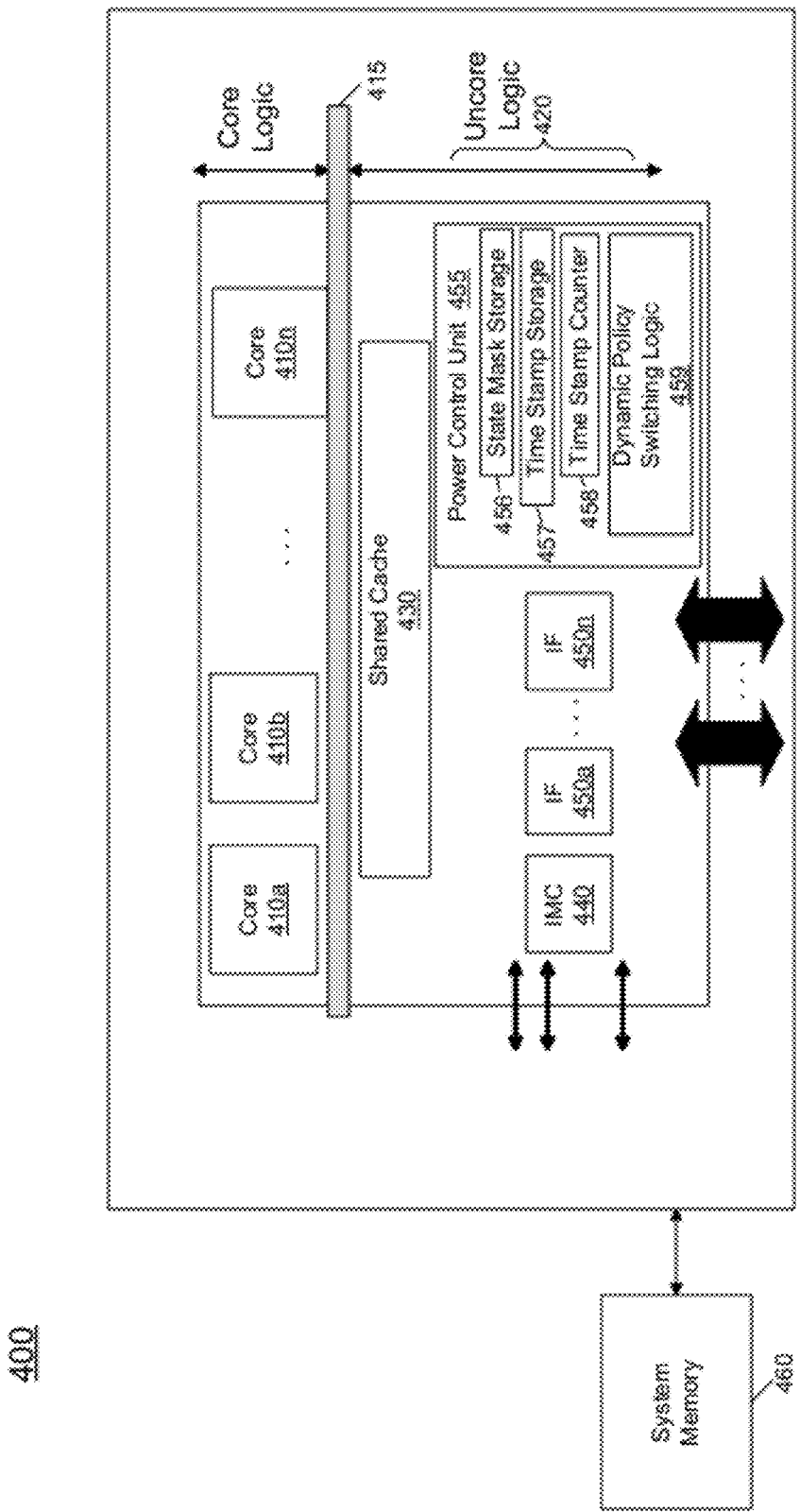
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a dynamic policy switching logic 459, which may be a logic to perform dynamic switching of a power management policy based on processor utilization. As further seen, various registers or other storages can be present and accessed by the logic. Specifically, state mask storage 456 can store masks associated with the active state and the maximum performance state, including a current and previous state mask for each state, each having an indicator for each core to indicate whether the core is in the corresponding state. In addition, residency counters (not shown in FIG. 5) can be present to store the accumulated values, which may be generated based on time stamp information in a time stamp storage 457 which can store an entry time for a given state per core, and a time stamp counter 458 which may be a counter to maintain a current system time stamp value.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
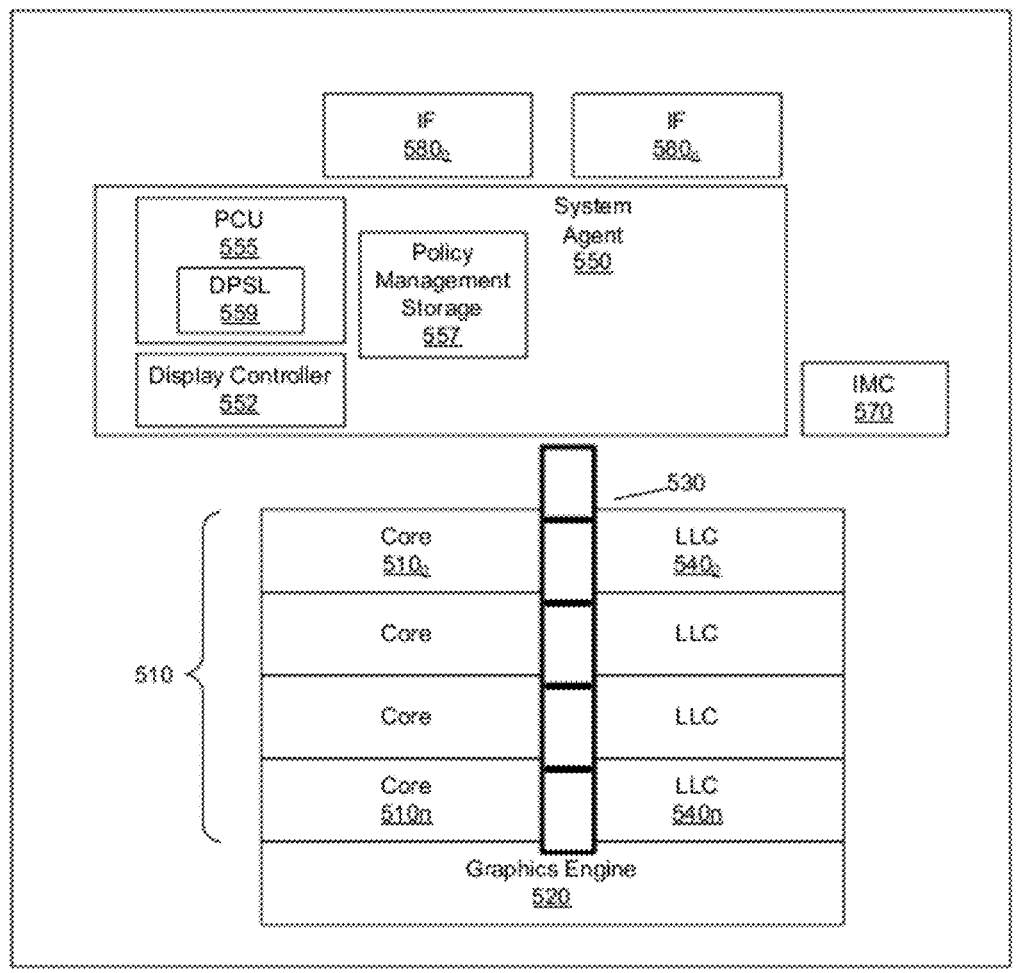
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In various embodiments, system agent domain 550 may execute at a fixed frequency and may remain powered on at all times to handle power control events and power management such that domains 510 and 520 can be controlled to dynamically enter into and exit low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a dynamic policy switching logic 559 in accordance with an embodiment of the present invention to dynamically control an active power management providing for a system based on a processor utilization, e.g., using information obtained from a policy management storage 557. In various embodiments, this logic may execute the algorithms described above in FIGS. 1, 2 and 4.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
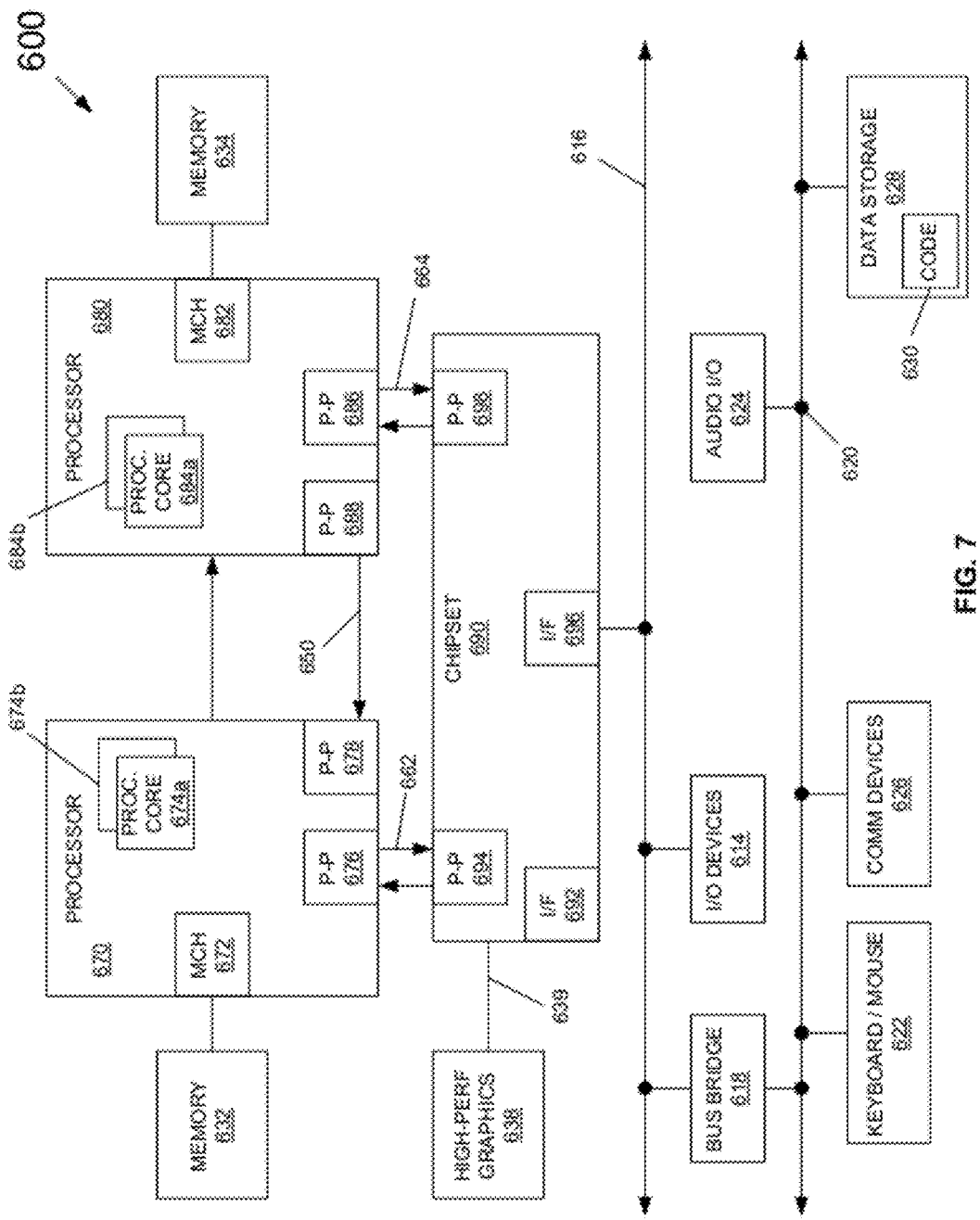
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform dynamic control of power management policy based on processor utilization, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, ultrabook, or so forth.

Figure 8:
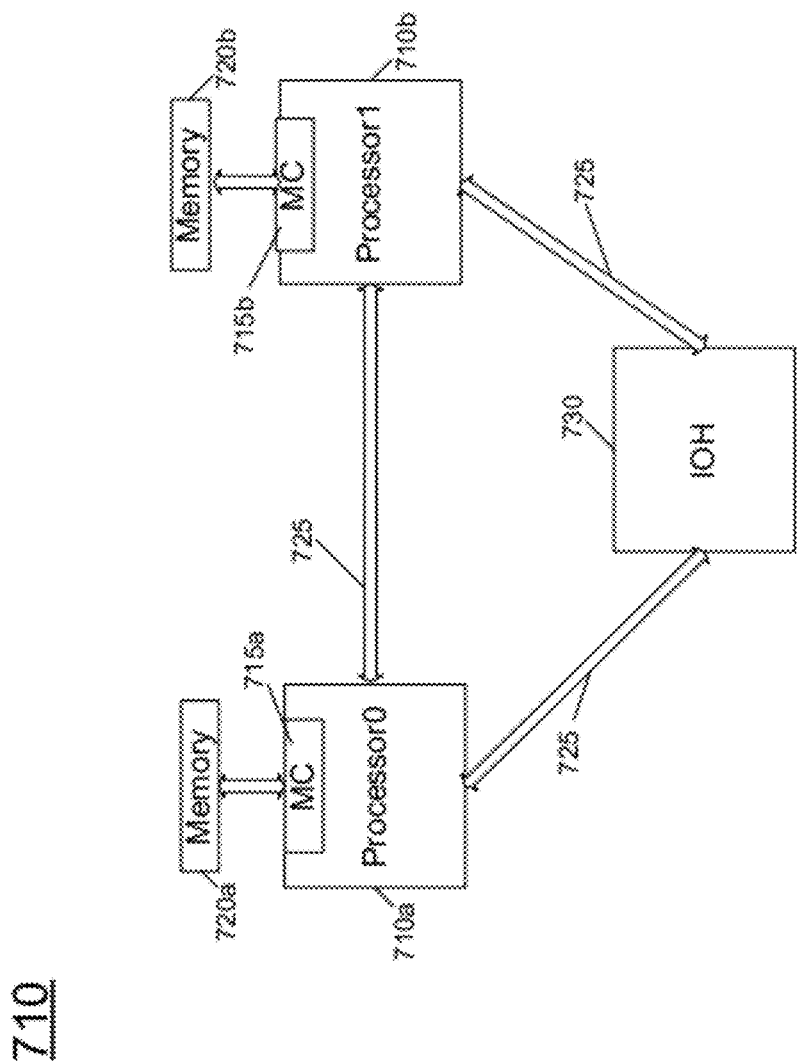
FIG. 8 is a block diagram of a multiprocessor system with a point-to-point (PtP) interconnect in accordance with one embodiment of the present invention.

FIG. 8 is a block diagram of a system coupled with point-to-point (PtP) system interconnects in accordance with a given cache coherence protocol using QPI links as the system interconnect. In the embodiment shown, each processor 710 is coupled to two PtP links 725 and includes one instance of an integrated memory controller 715 that in turn is coupled to a corresponding local portion of a system memory 720. Each processor can perform dynamic switching between different power management policies as described herein. The processors are connected to an input/output hub (IOH) 730 using one link and the remaining link is used to connect the two processors.

Figure 9:
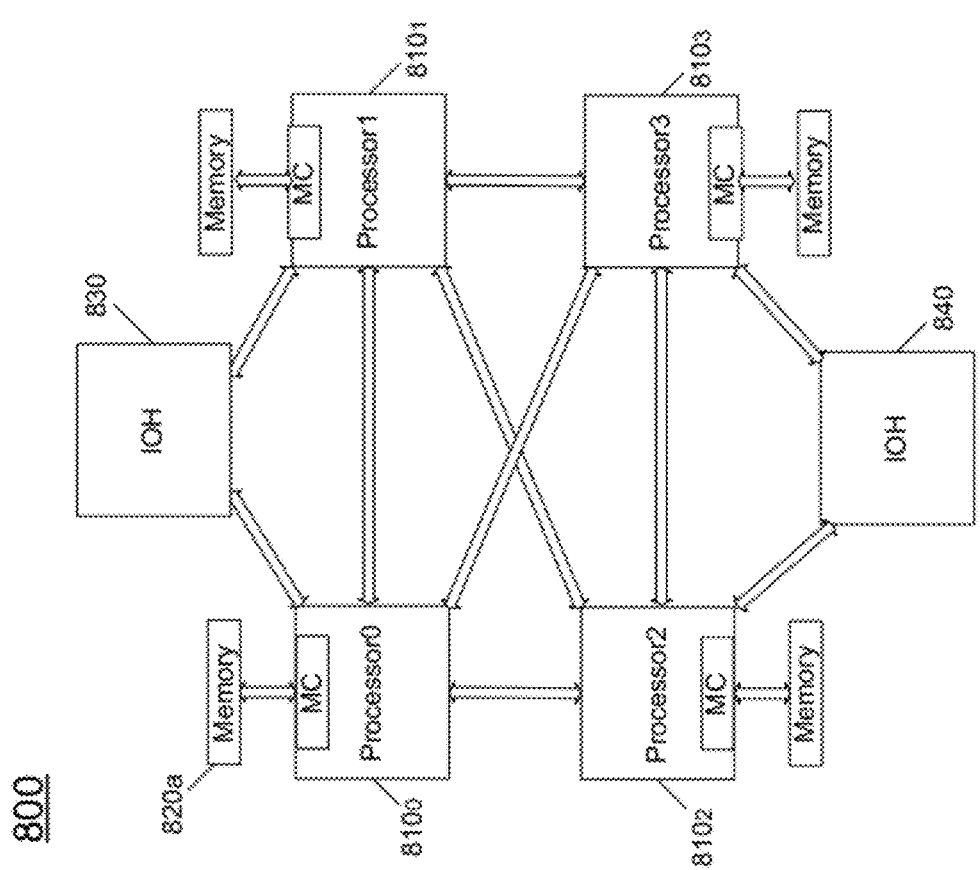
FIG. 9 is a block diagram of a partially connected quad processor system in accordance with one embodiment of the present invention.

Referring now to FIG. 9, shown is a block diagram of a system in accordance with another embodiment of the present invention. As shown in FIG. 9, system 800 may be a partially connected quad processor system in which each processor 810 (each of which may be multicore multi-domain processors) is coupled to each other processor via a PtP link and is coupled to a local portion of memory (e.g., dynamic random access memory (DRAM)) 820 via a memory interconnect coupled to an integrated memory controller 815 of the corresponding processor. In the partially connected system of FIG. 9, note the presence of two IOHs 830 and 840 such that processors $810_0$ and $810_1$ are directly coupled to IOH 830 and similarly processors $810_2$ and $810_3$ are directly coupled to IOH 840.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores and a power controller, the power controller including a logic having circuitry to dynamically update a power management policy for a system including the processor from a power saving biased policy to a performance biased policy when a utilization of the processor exceeds a threshold level, wherein the logic is to dynamically tune a loadline from the power saving biased policy to the performance biased policy when a ratio of a duration of a maximum performance state residency of the plurality of cores during an evaluation interval to a duration of an active state residency of the plurality of cores during the evaluation interval exceeds the threshold level.

2. The processor of claim 1, wherein a user is to select the power saving biased policy from a plurality of possible power saving biased policies.

3. The processor of claim 2, wherein the processor is to dynamically and automatically switch from the selected power saving biased policy to the performance biased policy when the utilization exceeds the threshold level.

4. The processor of claim 3, wherein the processor is to dynamically and automatically switch from the performance biased policy to the selected power saving biased policy when the utilization is less than a second threshold level, the second threshold level less than the threshold level.

5. The processor of claim 1, wherein the logic includes a dynamic loadline tuning circuit comprising:
a maximum performance accumulator to accumulate the maximum performance state residency during the evaluation interval;
an active state accumulator to accumulate the active state residency during the evaluation interval; and
an accumulator sampler to sample the maximum performance accumulator and the active state accumulator.

6. The processor of claim 5, wherein the dynamic loadline tuning circuit further comprises:
a comparator to compare the ratio to at least one of the threshold level and a second threshold level.

7. The processor of claim 6, wherein the dynamic loadline tuning circuit is to update the power management policy to the performance biased policy when the ratio is greater than the threshold level.

8. The processor of claim 5, further comprising a first active state mask to store a state of the plurality of cores at a first time period and a second active state mask to store a state of the plurality of cores at a second time period, and wherein the active state accumulator is to accumulate the active state residency based at least in part on the first and second active state masks and time stamps each associated with one of the plurality of cores and a current time stamp.

9. A method comprising:
 determining, in a circuit of a power controller of a multicore processor, an active state residency for a plurality of cores of the multicore processor during an evaluation interval;
 determining, in the circuit, a maximum performance state residency for the plurality of cores during the evaluation interval;
 determining, in the circuit, a ratio between the maximum performance state residency and the active state residency; and
 setting a power management policy based at least in part on the ratio.

10. The method of claim 9, further comprising if the ratio is greater than a high threshold, setting the power management policy to a performance policy.

11. The method of claim 10, further comprising if the ratio is less than a low threshold, setting the power management policy to a power saving policy.

12. The method of claim 11, further comprising if the ratio is between the high and low thresholds, maintaining a current power management policy.

13. The method of claim 11, further comprising dynamically updating the power management policy from the power saving policy to the performance policy when a utilization of the multicore processor exceeds a threshold.

14. The method of claim 13, further comprising dynamically updating the power management policy automatically via a logic of a power controller of the multicore processor.

15. A system comprising:
 a multicore processor including a plurality of cores and a power controller including a logic having circuitry to dynamically switch a power management policy for the multicore processor from a power biased policy to a performance biased policy when a utilization of the multicore processor exceeds a threshold level, wherein the logic is to determine an active state residency for the plurality of cores and a maximum performance state residency for the plurality of cores during an evaluation interval, compare the maximum performance state residency to the active state residency, and dynamically switch the power management policy based at least in part on the comparison; and
 a dynamic random access memory (DRAM) coupled to the multicore processor.

16. The system of claim 15, wherein the logic is to store a first active state mask to identify a state of the plurality of cores at a first time and a second active state mask to identify a state of the plurality of cores at a second time, and wherein the logic is to determine the active state residency based at least in part on the first and second active state masks, time stamps each associated with one of the plurality of cores and a current time stamp.

17. The system of claim 16, wherein the logic is to store a first performance state mask to identify a performance state of the plurality of cores at the first time and a second performance state mask to identify a performance state of the plurality of cores at the second time, and wherein the logic is to determine the maximum performance state residency based at least in part on the first and second performance state masks, the time stamps and the current time stamp.

18. The system of claim 15, wherein the logic is to accumulate the active state residency and the maximum performance state residency for a plurality of evaluation intervals to obtain an average active state residency and an average maximum performance state residency, to determine a ratio between the average maximum performance state residency and the average active state residency, and to dynamically switch the power management policy based at least in part on the ratio.

* * * * *